(12) United States Patent
Yu

(10) Patent No.: US 10,439,188 B2
(45) Date of Patent: Oct. 8, 2019

(54) LITHIUM SECONDARY BATTERY

(71) Applicants: LG CHEM, LTD., Seoul (KR); TORAY BATTERY SEPARATOR FILM CO., LTD., Nasushiobara-shi, Tochigi (JP)

(72) Inventor: Sung-Hoon Yu, Daejeon (KR)

(73) Assignees: LG CHEM, LTD., Seoul (KR); TORAY INDUSTRIES, INC., Tokyo (JP)

(*) Notice: Subject to any disclaimer, the term of this patent is extended or adjusted under 35 U.S.C. 154(b) by 322 days.

(21) Appl. No.: 14/716,266

(22) Filed: May 19, 2015

(65) Prior Publication Data

US 2015/0255771 A1 Sep. 10, 2015

Related U.S. Application Data

(63) Continuation-in-part of application No. 12/944,930, filed on Nov. 12, 2010, now Pat. No. 9,070,948.
(Continued)

(30) Foreign Application Priority Data

| Aug. 10, 2009 | (KR) | 10-2009-0073369 |
| Aug. 10, 2009 | (KR) | 10-2009-0073374 |
| Aug. 10, 2010 | (KR) | 10-2010-0076689 |

(51) Int. Cl.
*H01M 2/18* (2006.01)
*H01M 2/16* (2006.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
None
See application file for complete search history.

(56) References Cited

U.S. PATENT DOCUMENTS

| 6,589,690 B1 | 7/2003 | Sato et al. |
| 6,632,561 B1 | 10/2003 | Bauer et al. |

(Continued)

FOREIGN PATENT DOCUMENTS

| CN | 1253390 A | 5/2000 |
| CN | 1969407 A | 5/2007 |

(Continued)

OTHER PUBLICATIONS

A. Hofmann, T. Hanemann / Journal of Power Sources 298 (2015) 322e330.*

(Continued)

*Primary Examiner* — Tracy M Dove
(74) *Attorney, Agent, or Firm* — Birch, Stewart, Kolasch & Birch, LLP

(57) ABSTRACT

A lithium secondary battery includes a cathode, an anode, a separator interposed between the cathode and the anode, and a non-aqueous electrolyte solution obtained by dissolving lithium salt in a non-aqueous solvent. The separator includes a porous substrate having pores; and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles. The non-aqueous electrolyte solution has a viscosity of 1.4 cP or above at 25° C. This lithium secondary battery gives improved safety and excellent charging/discharging characteristics due to a low risk of (Continued)

leakage of a non-aqueous electrolyte solution and good wettability of separator with the solvent.

18 Claims, 4 Drawing Sheets

Related U.S. Application Data which is a continuation of application No. PCT/KR2010/005235, filed on Aug. 10, 2010.

(51) Int. Cl.
  *H01M 10/0569* (2010.01)
  *H01M 2/14* (2006.01)
  *H01M 10/0525* (2010.01)
  *H01M 4/505* (2010.01)
  *H01M 4/525* (2010.01)

(52) U.S. Cl.
  CPC ......... *H01M 2/18* (2013.01); *H01M 10/0525* (2013.01); *H01M 10/0569* (2013.01); *H01M 4/505* (2013.01); *H01M 4/525* (2013.01); *H01M 2300/004* (2013.01)

(56) References Cited

U.S. PATENT DOCUMENTS

| | | | |
|---|---|---|---|
| 7,662,517 B2 | 2/2010 | Lee et al. | |
| 7,704,641 B2 | 4/2010 | Yong et al. | |
| 7,883,799 B2 | 2/2011 | Seo et al. | |
| 2003/0118913 A1 | 6/2003 | Takami et al. | |
| 2005/0031963 A1 | 2/2005 | Im et al. | |
| 2006/0008700 A1 | 1/2006 | Yong et al. | |
| 2007/0009798 A1* | 1/2007 | Inagaki | C01G 23/005 429/231.1 |
| 2007/0009806 A1 | 1/2007 | Kim | |
| 2007/0042266 A1 | 2/2007 | Oh et al. | |
| 2007/0099072 A1 | 5/2007 | Hennige et al. | |
| 2007/0122716 A1 | 5/2007 | Seo et al. | |
| 2008/0044733 A1 | 2/2008 | Ohata et al. | |
| 2008/0118845 A1 | 5/2008 | Ihara et al. | |
| 2008/0138700 A1 | 6/2008 | Horpel et al. | |
| 2008/0193853 A1 | 8/2008 | Kim et al. | |
| 2009/0047582 A1 | 2/2009 | Kim et al. | |
| 2009/0068564 A1* | 3/2009 | Lee | H01M 10/0566 429/331 |
| 2010/0068613 A1 | 3/2010 | Deguchi | |
| 2010/0167124 A1 | 7/2010 | Seo et al. | |
| 2010/0285341 A1 | 11/2010 | Yun et al. | |
| 2010/0291430 A1 | 11/2010 | Lee et al. | |
| 2010/0304225 A1 | 12/2010 | Pascaly et al. | |
| 2011/0064988 A1 | 3/2011 | Yu | |
| 2012/0177956 A1 | 7/2012 | Im et al. | |

FOREIGN PATENT DOCUMENTS

| | | |
|---|---|---|
| CN | 101371398 A | 2/2009 |
| EP | 2 023 434 A1 | 2/2009 |
| JP | 2002-529891 A | 9/2002 |
| JP | 2007-504628 A | 3/2007 |
| JP | 2008-503049 A | 1/2008 |
| JP | 2008-524824 A | 7/2008 |
| JP | 2009-508148 A | 2/2009 |
| JP | 2009-135076 A | 6/2009 |
| JP | 2012-510704 A | 5/2012 |
| KR | 10-2000-0076975 A | 12/2000 |
| KR | 10-2006-0021222-A- | 3/2006 |
| KR | 10-2006-0104164 A | 10/2006 |
| KR | 10-2007-0006253 A | 1/2007 |
| KR | 10-2007-0019958 A | 2/2007 |
| KR | 10-0775295 B1 | 11/2007 |
| KR | 10-2008-0010166 A | 1/2008 |
| KR | 10-2008-0046562 A | 5/2008 |
| KR | 10-2009-0037552 A | 4/2009 |
| KR | 10-2009-0051546 A | 5/2009 |

OTHER PUBLICATIONS

Ethylene Carbonate Fact Sheet, New Japan Chemical Co., Lrd. Internet printout, No date.

Lewandowski, "Ionic liquids as electrolytes for Li-ion batteries—An overview of electrochemical studies", Journal of Power Sources, vol. 194, (2009), pp. 601-609.

* cited by examiner

LITHIUM SECONDARY BATTERY

CROSS-REFERENCE TO RELATED APPLICATION

This application is a continuation in part application of U.S. patent application Ser. No. 12/944,930 filed on Nov. 12, 2010, which is a Continuation of PCT/KR2010/005235, filed Aug. 10, 2010, and which claims priority under 35 USC 119(a) to Korean Patent Application No. 10-2009-0073369 filed in Republic of Korea on Aug. 10, 2009, Korean Patent Application No. 10-2009-0073374 filed in Republic of Korea on Aug. 10, 2009, and Korean Patent Application No. 10-2010-0076689 filed in Republic of Korea on Aug. 10, 2010, the entire contents of which are incorporated herein by reference.

TECHNICAL FIELD

The present invention relates to a lithium secondary battery, and more particularly to a lithium secondary battery comprising a separator with a porous coating layer comprising a mixture of binder polymers and inorganic particles; and a non-aqueous electrolyte solution comprising a high viscous non-aqueous solvent and a lithium salt.

BACKGROUND ART

Recently, interests on energy storage technologies are more increased. As the energy storage technologies are extended to cellular phones, camcorders and notebook PC, and further to electric vehicles, the demand for high-energy of a battery useable as a power source of such an electronic device increases. A lithium secondary battery is one of the most satisfactory batteries, and many studies are now in active progress.

A lithium secondary battery developed in the early 1990's includes an anode made of carbon material capable of intercalating or disintercalating lithium ions, a cathode made of lithium-containing oxide, a separator interposed between the anode and the cathode, and a non-aqueous electrolyte solution obtained by dissolving a suitable amount of lithium salt in a non-aqueous solvent.

The non-aqueous electrolyte solution for lithium secondary batteries generally has a polarity whereas a porous polymer substrate used as a component of a separator, especially polyolefin-based film or non-woven fabric, is non-polar (hydrophobic). Therefore, it is difficult to wet separator with a non-aqueous electrolyte solution sufficiently.

If a separator in a lithium secondary battery is not sufficiently wetted with non-aqueous electrolyte solution, charging or discharging of the lithium secondary battery becomes deteriorated or disabled. That is, a lithium secondary battery can be charged or discharged only when the separator is sufficiently wet with the non-aqueous electrolyte solution.

Therefore, such poor wettability of the separator with a non-aqueous electrolyte solution has been a technical problem to be solved in the art. In order to solve the problem, low-viscous linear carbonate compounds such as dimethyl carbonate, ethylmethyl carbonate or diethyl carbonate, and/or, a low-viscous linear ester compounds have been added into a non-aqueous electrolyte solution in the art.

By this, a non-aqueous solvent is adjusted to have a viscosity equal to or slightly more than 1.0 cP at 25° C. and wettability of the separator has been improved in a degree.

However, a non-aqueous solvent adjusted to have a viscosity equal to or slightly more than 1.0 cP at 25° C. may cause another problem of liquid leak. Further, the non-aqueous solvent tends to evaporate easily due to its strong volatile property. Furthermore, since a non-aqueous electrolyte solution comprising the non-aqueous solvent has a low viscosity, the non-aqueous electrolyte solution has strong flammability, which leads to safety-related problems such as firing or explosion at the time of overcharging, thermal runaway or piercing of the separator.

Thus, there is a strong demand of a non-aqueous electrolyte solution which can be used more safely in a secondary battery.

In order to meet the demand, there have been proposed methods, such as adding a surfactant or applying heat or pressure when a non-aqueous electrolyte solution is injected, but these methods need additional processes and thus they are not economical.

DISCLOSURE

Technical Problem

The present invention is designed to solve the above problems and is directed to providing a lithium secondary battery having an improved safety and excellent charging/discharging characteristics.

Technical Solution

In one aspect of the present invention, there is provided a lithium secondary battery, which includes a cathode, an anode, a separator interposed between the cathode and the anode, and a non-aqueous electrolyte solution comprising a lithium salt and a non-aqueous solvent, wherein the separator includes: a porous substrate having pores; and a porous coating layer coated on at least one surface of the porous substrate and having inorganic particles and a binder polymer, the inorganic particles being connected and fixed to each other by means of the binder polymer, the porous coating layer having pores therein formed by interstitial volumes among the inorganic particles, wherein the non-aqueous electrolyte solution has a viscosity of 1.4 cP or above and 50 cP or less at 25° C.

In the lithium secondary battery according to the present invention, the non-aqueous solvent may be selected from group consisting of γ-butyrolactone (1.75 cP at 25° C.), fluoroethylene carbonate (4.1 cP at 25° C.), ethylene carbonate (solid state at ambient temperature, 1.9 cP 40° C.), propylene carbonate (2.5 cP at 25° C.), butylene carbonate (3.1 cP at 25° C.), 2,3-butylene carbonate (2.8 cP at 25° C.), iso-butylene carbonate (2.7 cP at 35° C.), difluoroethylene carbonate (2.5 cP at ambient temperature), sulfolane (10.3 cP at 30° C.), succinonitrile (2.7 cP at 60° C.), glutaronitrile (5.3 cP at 25° C.), adiponitrile (6.1 cP at 25° C.), suberonitrile (8.2 cP at 25° C.), sebaconitrile (10.7 cP at 25° C.) and their mixtures.

In the lithium secondary battery according to the present invention, the lithium salt may be included in a concentration of 0.8 M or above and 2.0 M or less in the non-aqueous electrolyte solution.

In the lithium secondary battery according to the present invention, the lithium salts may be one or a mixture of at least two selected from $LiPF_6$, $LiBF_4$, LiFSI (Lithium bis (fluorosulfonyl)imide, $F_2NO_4S_2Li$), LiBETI (lithium bisperfluoroethanesulfonimide, $LiN(C_2F_5SO_2)_2$), LiTFSI (lithium (bis)trifluoromethanesulfonimide, $LiN(CF_3SO_2)_2$), $CF_3SO_3Li$, $LiC(CF_3SO_2)_3$, $LiSbF_6$, $LiAsF_6$, $LiClO_4$, LiD-FOB ($LiC_2BO_4F_2$), LiTFOP ($LiC_2PO_4F_4$), LiDFOP ($LiC_4PO_4F_2$), LiDFP ($LiPO_2F_2$), LiN ($C_2F_5SO_2$)$_2$ and LiBOB($LiC_4BO_8$).

In the lithium secondary battery according to the present invention, the non-aqueous electrolyte solution may have a viscosity of 3.5 cP or above and 60 cP or less at 25° C.

In the lithium secondary battery according to the present invention, the porous substrate may use a polyolefin-based porous film, for example, polyethylene, polypropylene, polybutylene and polypentene in single or in mixture. Also, the porous substrate may use a non-woven fabric made of polyester, polyacetal, polyamide, polycarbonate, polyimide, polyetheretherketone, polyethersulfone, polyphenylene oxide, polyphenylene sulfide and polyethylene naphthalene in single or in mixture.

In the lithium secondary battery according to the present invention, the inorganic particles of the porous coating layer preferably have an average diameter of 0.001 to 10 μm. Here, the inorganic particles may use the inorganic particles having a dielectric constant of 5 or above and the inorganic particles having lithium ion transferring capability in single or in mixture.

In the lithium secondary battery according to the present invention, the binder polymer of the porous coating layer preferably has a solubility parameter of 15 to 45 Mpa$^{1/2}$, and may be for example polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and so on.

Advantageous Effects

According to the present invention, the porous coating layer formed with inorganic particles and a binder polymer improves a wettability of a separator with the high-viscous non-aqueous electrolyte solution.

Further, since the low-viscous solvent which has a low flash point can be used in a less amount according to the present invention, a lithium secondary battery comprising the low-viscous solvent can show an improved safety and excellent charging/discharging characteristics.

DESCRIPTION OF DRAWINGS

Other objects and aspects of the present invention will become apparent from the following description of embodiments with reference to the accompanying drawing in which.

BEST MODE

Figure 1:
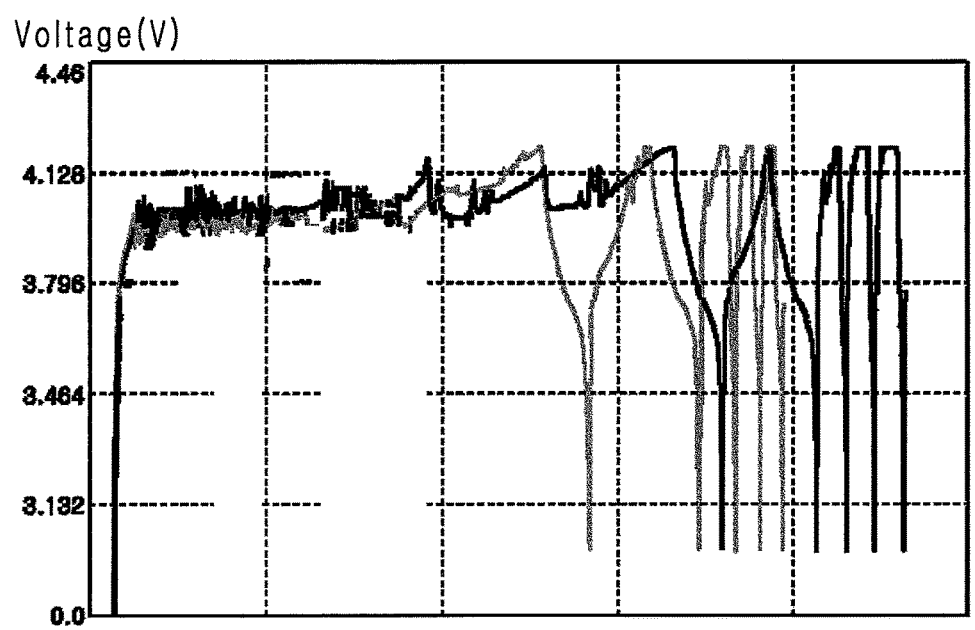
FIG. 1 is a graph showing charging/discharging results for a coin cell according to a comparative example 1.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A lithium secondary battery of the present invention includes a cathode, an anode, a separator interposed between the cathode and the anode, and a non-aqueous electrolyte solution obtained by dissolving lithium salt in a non-aqueous solvent.

The separator includes a porous substrate having pores, and a porous coating layer located on at least one surface of the porous substrate and having inorganic particles and a binder polymer, the inorganic particles being connected and fixed to each other by means of the binder polymer, the porous coating layer having pores therein formed by interstitial volumes among the inorganic particles.

(a) Non-Aqueous Electrolyte Solution

The non-aqueous electrolyte solution according to the present invention comprises a non-aqueous solvent and a lithium salt, and has a viscosity of 3.5 centipoise (cP) or above at 25° C., more specifically, a viscosity of 3.5 cP or above and 60 cP or less at 25° C.

If the non-aqueous electrolyte solution has a viscosity less than 3.5 cP at 25° C., it is likely that secondary batteries have a lowered safety or show lowered performances. Further, if the non-aqueous electrolyte solution has a viscosity more than 60 cP at 25° C., the separator comprising a porous coating having a mixture of binder polymers and inorganic particles cannot be sufficiently wetted with the non-aqueous electrolyte solution.

The viscosity of a non-aqueous electrolyte solution can be substantially determined by the viscosity of the non-aqueous solvent and a concentration of a lithium salt.

(a-1) Non-Aqueous Solvent

According to the present invention, the non-aqueous solvent has a viscosity of 1.4 cP or above and 50 cP or less at 25° C. More specifically, the non-aqueous solvent has a viscosity of 1.7 cP or above and 30 cP or less at 25° C.

It is considered that the viscosity of the non-aqueous solvent affects the viscosity of the non-aqueous electrolyte solution more than the concentration of lithium salt does.

If the non-aqueous solvent has a viscosity more than 50 cP at 25° C., the safety of secondary battery can improve, however, the ionic conductivity of the non-aqueous electrolyte and wettability of the separator are lowered, which deteriorates the performances of secondary batteries. Further, the non-aqueous solvent has a viscosity less than 1.4 cP at 25° C., the safety of the secondary battery cannot be secured.

The non-limiting examples of the non-aqueous solvent may be one or a mixture of at least two selected from group consisting of γ-butyrolactone (1.75 cP at 25° C.), fluoroethylene carbonate (4.1 cP at 25° C.), ethylene carbonate (solid state at ambient temperature, 1.9 cP 40° C.), propylene carbonate (2.5 cP at 25° C.), butylene carbonate (3.1 cP at 25° C.), 2,3-butylene carbonate (2.8 cP at 25° C.), iso-butylene carbonate (2.7 cP at 35° C.), difluoroethylene carbonate (2.5 cP at ambient temperature), sulfolane (10.3 cP at 30° C.), succinonitrile (2.7 cP at 60° C.), glutaronitrile (5.3 cP at 25° C.), adiponitrile (6.1 cP at 25° C.), suberonitrile (8.2 cP at 25° C.) and sebaconitrile (10.7 cP at 25° C.).

For example, a non-aqueous solvent consisting of ethylene carbonate and gamma-butyrolactone (2:3 v/v, 2.0 cP at 25° C.) or a non-aqueous solvent consisting of fluoroethylene carbonate (4.1 cP at 25° C.) can be used.

Further, any high-viscous non-aqueous solvent which can be used in the art and contribute to thermal stability of the battery may be used. For example, an ionic liquid which is not easily burnt or volatilized and exhibits relatively high ion conductivity can be used. The non-limiting examples of the ionic liquid are imidazole-based ionic liquid, ammonium-based ionic liquid, pyrolidium-based ionic liquid, pyridinium-based ionic liquid and phosphonium-based ionic liquid, which may be used in single or in mixture. More specifically, the non-limiting examples of the imidazole-based ionic liquid are 1-ethyl-3-methylimidazolium (EMI)-trifluoromethanesulfonylamide (($CF_3SO_2$)$_2$N) 1-butyl-3-methylimidazolium (BMI)-($CF_3SO_2$)$_2$N, 1-hexyl-3-methylimidazolium (HMI)-($CF_3SO_2$)$_2$N, EMI-$PF_6$, BMI-$PF_6$, HMI-$PF_6$, EMI-$BF_4$, BMI-$BF_4$, HMI-$BF_4$, EMI-$CH_3SO_3$, BMI-$CH_3SO_3$ or HMI-$CH_3SO_3$.

The non-aqueous solvent of the present invention may be mixed with a low-viscous non-aqueous solvent such as dimethyl carbonate or other kinds of non-aqueous solvents such as cyclic carbonate, if the entire non-aqueous solvent has a viscosity of 1.4 cP or above at 25° C.

(a-2) Lithium Salt

According to the present invention, the lithium salt in a non-aqueous electrolyte solution has a concentration of 0.8 M or above and 2.0 M or less at 25° C., more specifically 0.8 M or above and 1.4 M or less at 25° C. in favor of ionic conductivity.

When the concentration of lithium salt is less than 0.8 M, the ionic conductivity of the non-aqueous electrolyte solution decreases dramatically and make the viscosity of the finally obtained non-aqueous electrolyte solution low even in case high-viscous non-aqueous solvent is used, which reduces the wettability of a separator comprising a porous coating layer. Further, if the concentration of the lithium salt is more than 2.0 M, the ionic conductivity of the non-aqueous electrolyte solution becomes lowered and the viscosity of the finally obtained non-aqueous electrolyte solution may rise rapidly irrespective of the viscosity of the non-aqueous solvents, which deteriorates the wettability of a separator without a porous coating layer.

The lithium salt commonly used in the art for lithium secondary batteries can be used for the present invention if the purpose of the present invention can be met. The non-limiting examples of the lithium salts are one or a mixture of at least two selected from $LiPF_6$, $LiBF_4$, LiFSI (Lithium bis(fluorosulfonyl)imide, $F_2NO_4S_2Li$) LiBETI (lithium bisperfluoroethanesulfonimide, $LiN(C_2F_5SO_2)_2$), LiTFSI (lithium (bis)trifluoromethanesulfonimide, $LiN(CF_3SO_2)_2$), $CF_3SO_3Li$, $LiC(CF_3SO_2)_3$, $LiSbF_6$, $LiAsF_6$, $LiClO_4$, LiDFOB ($LiC_2BO_4F_2$), LiTFOP ($LiC_2PO_4F_4$), LiDFOP ($LiC_4PO_4F_2$) LiDFP ($LiPO_2F_2$), LiN ($C_2F_5SO_2$)$_2$, LiBOB($LiC_4BO_8$) and so on.

(c) Separator

According to the present invention, the separator includes a porous substrate having pores, and a porous coating layer located on at least one surface of the porous substrate and having inorganic particles and a binder polymer wherein the inorganic particles are connected and fixed to each other by means of the binder polymer and the porous coating layer having pores therein are formed by interstitial volumes among the inorganic particles.

The porous substrate having pores may use a porous film or a porous non-woven fabric commonly used as a separator of a lithium secondary battery. The porous film may be a polyolefin-based porous film, for example polyethylene, polypropylene, polybutylene and polypentene, which may be used in single or in mixture. Also, the non-woven fabric may be formed from polyester, polyacetal, polyamide, polycarbonate, polyimide, polyetheretherketone, polyethersulfone, polyphenylene oxide, polyphenylene sulfide and polyethylene naphthalene in single or in mixture, besides the above polyolefin-based non-woven fabrics.

The porous substrate preferably has a thickness of 1 to 100 μm, though not limited thereto. Size and porosity of the pores existing in the porous substrate are also not specially limited, but preferably 0.01 to 50 μm and 10 to 95%, respectively.

A porous coating layer is formed on at least one surface of the porous substrate. The porous coating layer includes a plurality of inorganic particles and a binder polymer. The inorganic particles are connected and fixed to each other by means of the binder polymer, and pores of the porous coating layer are formed by interstitial volumes among the inorganic particles. The porous coating layer of such a structure may be easily formed by adjusting contents of inorganic particles and binder polymer and controlling process conditions. The inorganic particles of the porous coating layer have good affinity with respect to non-aqueous solvents. Thus, a high-viscous electrolyte solution easily permeates the porous coating layer through the pores formed by interstitial volumes among the inorganic particles. In other words, the porous coating layer plays a role of improving wettability of the separator with the high-viscous electrolyte solution.

The inorganic particles used for forming the porous coating layer is not specially limited if it is electrochemically stable. In other words, the inorganic particles useable in the present invention are not limited if they do not cause oxidation or reduction reaction in an operating voltage range (for example, 0 to 5V based on Li/Li$^+$) of a lithium secondary battery to which the present invention is applied. In particular, in case an inorganic particle with a high dielectric constant is used, it contributes to the increase of dissociation of electrolyte salt, for example lithium salt, in the electrolyte solution, thereby improving ion conductivity of the electrolyte solution.

Due to the above reasons, it is preferred that the inorganic particles include inorganic particles having a dielectric constant of 5 or above, preferably 10 or above. The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT, here 0<x<1, 0<y<1), $PB(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or their mixtures, but not limitedly.

Also, the inorganic particles may use inorganic particles having lithium ion transferring capability, or inorganic particles having a function of moving a lithium ion without storing lithium. The inorganic particle having lithium ion transferring capability may be lithium phosphate ($Li_3PO_4$), lithium titanium phosphate ($Li_xTi_y(PO_4)_3$, 0<x<2, <y<3), lithium aluminum titanium phosphate ($Li_xAl_yTi_z(PO_4)_3$, 0<x<2, 0<y<1, 0<z<3), (LiAlTiP)$_xO_y$-based glass (0<x<4, 0<y<13) such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as LiI—$Li_2S$—$P_2S_5$, or their mixtures, but not limitedly.

The average diameter of inorganic particles is not specially limited, but it preferably ranges from 0.001 to 10 μm in order to form a coating layer with a uniform thickness and ensure suitable porosity. If the average diameter of the particle is less than 0.001 μm, a dispersing property of inorganic particles may be deteriorated. If the average diameter exceeds 10 μm, the thickness of the porous coating layer is increased.

Also, the binder polymer used for forming the porous coating layer preferably may be a polymer having a glass transition temperature ($T_g$) ranging from −200 to 200° C., since this polymer may improve mechanical properties such as flexibility and elasticity of the finally formed porous coating layer. This binder polymer sufficiently plays a role of binder for connection and stable fixation among inorganic particles or between inorganic particles and the porous substrate. The binder polymer may use any polymer commonly used in the art for forming a porous coating layer on the porous substrate, and here the binder polymer uses a polymer with more excellent thermal resistance than the porous substrate.

The ion transferring capability is not essential to the binder polymer, but a binder polymer having ion transferring capability may further improve the performance of a lithium secondary battery. Thus, the binder polymer preferably has as high dielectric constant as possible. In fact, a solubility parameter of salt in an electrolyte solution depends on a dielectric constant of an non-aqueous solvent, so a binder polymer with a higher dielectric constant may improve the degree of salt dissociation further in an electrolyte. Such a binder polymer preferably has a dielectric constant ranging from 1.0 to 100 (a measurement frequency is 1 kHz), particularly 10 or above.

In addition to the above functions, the binder polymer may exhibit a high degree of swelling as it gellates when being swelled in a liquid electrolyte solution. Accordingly, a polymer having a solubility parameter ranging from 15 to $Mpa^{1/2}$ is preferred, and the solubility parameter more preferably ranges from 15 to 25 $Mpa^{1/2}$ and 30 to 45 $Mpa^{1/2}$. Thus, hydrophilic polymer having many polar groups is preferred rather than hydrophobic polymer such as polyolefin. If the solubility parameter is less than 15 $Mpa^{1/2}$ or greater than 45 $Mpa^{1/2}$, the polymer may not be easily swelled in a common non-aqueous electrolyte solution for batteries.

Such polymer may be polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate copolymer, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and so on, but not limitedly.

A ratio of the inorganic particles to the binder polymer in the porous coating layer formed on the porous substrate according to the present invention is preferably 50:50 to 99:1, more preferably 70:30 to 95:5. If the ratio of the inorganic particles to the binder polymer is less than 50:50, the content of polymer is so great that pore size and porosity of the porous coating layer may be decreased. If the content of inorganic particles exceeds 99 parts by weight, the peeling resistance of the porous coating layer may be weakened since the content of binder polymer is so small. Pore size and porosity of the porous coating layer are not specially limited, but the pore size is preferably 0.001 to 10 μm and the porosity is preferably 10 to 90%. The pore size and porosity are mainly dependent on the size of inorganic particles. For example, in case inorganic particles have a diameter of 1 μm or less, the formed pore is also approximately 1 μm or less. The pores as mentioned above are filled with a non-aqueous electrolyte solution injected later, and the filled non-aqueous electrolyte solution plays a role of transferring ions. In case the pore size and porosity are respectively less than 0.001 μm and less than 10%, the porous coating layer may act as a resistance layer. In case the pore size and porosity are respectively greater than 10 μm and greater than 90%, mechanical properties may deteriorate.

The separator of the present invention may further include other additives which is not detrimental to the aim of the present invention, in addition to the inorganic particles and the binder polymer, mentioned above, as components of the porous coating layer. The porous coating layer preferably has a thickness of 0.01 to 20 μm.

The separator mentioned above may be made by coating a porous substrate with the binder polymer solution in which inorganic particles are dispersed. Various common coating methods well known in the art may be used, for example dip coating, die coating, roll coating, comma coating or their combinations. The porous coating layer can be formed on both sides or one side of the porous substrate as necessary.

The separator prepared as mentioned above according to the present invention is interposed between a cathode and an anode. At this time, in case a polymer that is gellable at swelling in electrolyte solution is used as a binder polymer component, the binder polymer may react with the electrolyte solution which is injected after battery is assembled and then gellated.

(c) Cathode and Anode

Electrodes (cathode and anode) applied together with the separator of the present invention are not specially limited, and they may be made by binding electrode active materials to an electrode current collector according to a common method well known in the art. Among the electrode active materials, a cathode active material may use any cathode active material commonly used in the art for lithium secondary batteries, and particularly lithium manganese oxide, lithium cobalt oxide, lithium nickel oxide, lithium iron oxide, or lithium composite oxides where the above oxides are combined are preferred. An anode active material may use any anode active material commonly available for an anode of lithium secondary batteries, not limitedly, and particularly lithium metal or lithium alloys, carbon, petroleum coke, activated carbon, graphite or lithium adsorption material such as other carbonaceous substances are preferred. The cathode current collector may be a foil made of aluminum, nickel or their combination, not limitedly, and the anode current collector may be a foil made of copper, gold, nickel or copper alloys or their combinations.

MODE FOR INVENTION

Hereinafter, the present invention is explained in more detail using embodiments. However, the following embodiments may be modified in various ways, and the present invention should not be interpreted as being limited thereto.

The following embodiments are just given for persons having ordinary skill in the art to understand the present invention in a better way.

Preparation Example

Dimethyl carbonate (DMC) corresponding to a low-viscous non-aqueous solvent was added in an amount as disclosed in following table 1 to a non-aqueous solvent (1.99 cP at 25° C.) consisting of ethylene carbonate:gamma-butyrolactone in a ratio of 2:3 v/v. After that, 1M $LiPF_6$ was added thereto to prepare non-aqueous electrolyte solution.

TABLE 1

|  | Amount of DMC (gram) | Viscosity (cP) | |
|---|---|---|---|
|  |  | Prior to addition of $LiPF_6$ | After addition of $LiPF_6$ |
| (a) | 0 | 1.99 | 6.49 |
| (b) | 1 | 1.65 | 5.62 |
| (c) | 2 | 1.44 | 4.87 |
| (d) | 3 | 1.28 | 4.66 |
| (e) | 4 | 1.18 | 3.90 |
| (f) | 5 | 1.10 | 3.48 |
| (g) | 6 | 1.05 | 3.27 |
| (h) | 7 | 1.01 | 3.09 |
| (i) | 8 | 0.97 | 2.90 |

It can be confirmed from (i) of the above table 1 that a viscosity of non-aqueous electrolyte solution may rise by 4.5 cP after 1M $LiPF_6$.

Example 1

Preparation of Separator 5 parts by weight of polyvinylidenefluoride-hexafluoropropylene copolymer and 5 parts by weight of cyanoethyl-polyvinylalcohol were respectively added to acetone and dissolved at 50° C. for about 12 hours or more to prepare a binder polymer solution. The prepared polymer solution was added with $Al_2O_3$ powder so that a weight ratio of polymer mixture/$Al_2O_3$=10/90, and then $Al_2O_3$ powder was pulverized for 12 hours or more into an average diameter of 400 nm by means of ball milling and then dispersed to prepare slurry. The slurry prepared as above was applied to a polyethylene/polypropylene lamination film with a thickness of 16 μm by means of dip coating, and a coating thickness was controlled to be about 4 μm based on one surface of the film. Pore size in the porous coating layer formed on the film was about 0.5 μm, and porosity was 58%.

Preparation of Cell

The separator prepared as above was interposed between a cathode in which $LiCoO_2$ and $Li(Ni_{0.53}Co_{0.20}Mn_{0.27})O_2$ were mixed at a ratio of 2:1 and an anode that is made of artificial graphite, then a non-aqueous electrolyte solution (a viscosity of 8.28 cP at 25° C.) obtained by dissolving 1.0M of $LiPF_6$ into fluoroethylene carbonate (a viscosity of 4.1 cP at 25° C.) was injected thereto. After that, a coin cell was made in a general way.

Example 2

A coin cell was made in the same way as the example 1, except that polyethyleneterephthalate non-woven fabric with a thickness of 12 μm was used instead of the polyethylene/polypropylene lamination film of the example 1 to form a porous coating layer of the separator. The non-woven fabric used herein was made of super fine yarns with an average thickness of about 3 μm, and pores with a longitudinal diameter of less than 70 μm were in excess of 50% in the non-woven fabric.

Example 3

A coin cell was made in the same way as the example 1, except that a non-aqueous electrolyte solution (a viscosity of 5.23 cP at 25° C.) obtained by dissolving 1.5M of $LiBF_4$ into a mixed solvent in which ethylene carbonate and γ-butyrolactone were mixed at a ratio of 2:3 (v/v, a viscosity of 2.0 cP at 25° C.) was used instead of the non-aqueous electrolyte solution of the example 1.

Example 4

A coin cell was made in the same way as the example 2, except that a non-aqueous electrolyte solution (a viscosity of 5.23 cP at 25° C.) obtained by dissolving 1.5M of $LiBF_4$ into a mixed solvent in which ethylene carbonate and γ-butyrolactone were mixed at a ratio of 2:3 (v/v) (a viscosity of 2.0 cP at 25° C.) was used instead of the non-aqueous electrolyte solution of the example 2.

Example 5

A coin cell was made in the same way as the example 1, except that a non-aqueous electrolyte solution (a viscosity of 3.93 cP at 25° C.) obtained by dissolving 1.5M of $LiBF_4$ into a mixed solvent in which ethylene carbonate, γ-butyrolactone and dimethyl carbonate were mixed at a ratio of 2:3:2 (v/v, a viscosity of 1.44 cP at 25° C.) was used instead of the non-aqueous electrolyte solution of the example 1.

Example 6

A coin cell was made in the same way as the example 2, except that a non-aqueous electrolyte solution (with a viscosity of 3.93 cP at 25° C.) obtained by dissolving 1.5M of $LiBF_4$ into a mixed solvent in which ethylene carbonate, γ-butyrolactone and dimethyl carbonate were mixed at a ratio of 2:3:2 (v/v, a viscosity of 1.44 cP at 25° C.) was used instead of the non-aqueous electrolyte solution of the example 2.

Example 7

A coin cell was made in the same way as the example 1, except that a non-aqueous electrolyte solution (a viscosity of 52.2 cP at 25° C.) obtained by dissolving 0.8M of LiTFSI into $EMI\text{-}(CF_3SO_2)_2N$ (a viscosity of 45.9 cP at 25° C.) was used instead of the non-aqueous electrolyte solution of the example 1.

Example 8

A coin cell was made in the same way as the example 7, except that polyethyleneterephthalate non-woven fabric with a thickness of 12 μm was used instead of the polyethylene/polypropylene lamination film of the example 7 to form a porous coating layer of the separator. The non-woven fabric used herein was made of super fine yarns with an average thickness of about 3 μm, and pores with a longitudinal diameter of less than 70 μm were in excess of 50%.

Example 9

A coin cell was made in the same way as the example 6, except that a non-aqueous electrolyte solution (a viscosity of 5.04 cP at 25° C.) obtained by dissolving 1.5M $LiBF_4$ into a non-aqueous solvent comprising a mixture of EMI-$(CF_3SO_2)_2N$ and dimethyl carbonate at a ratio of 4:6 (v/v, a viscosity of 1.94 cP at 25° C.) was used instead of the non-aqueous electrolyte solution of the example 6.

Example 10

A coin cell was made in the same way as the example 8, except that a non-aqueous electrolyte solution (a viscosity of 4.91 cP at 25° C.) obtained by dissolving 0.8M of LiTFSI into a non-aqueous solvent comprising a mixture of EMI-$(CF_3SO_2)_2N$ and dimethyl carbonate at a ratio of 4:6 (v/v, a viscosity of 1.94 cP at 25° C.) was used instead of the non-aqueous electrolyte solution of the example 8.

Example 11

95 weight % of $LiCoO_2$ serving as a cathode active material, 2.5 weight % of Super-P™ serving as a conducting agent and 2.5 weight % of PVdF serving as a binder were added with NMP (N-methyl-2-pyrrolidone) to make a cathode active material slurry, and the slurry was applied to one side of an aluminum foil and then dried and compressed to make a cathode.

95 weight % of artificial graphite serving as an anode active material, 2.5 weight % of Super-P™ serving as a conducting agent and 2.5 weight % of PVdF serving as a binder were added with NMP (N-methyl-2-pyrrolidone) to make an anode active material slurry, and the slurry was applied to one side of a copper foil and then dried and compressed to make an anode.

A separator purchased from Celgard, LLC was interposed between the above cathode and anode to make an electrode assembly, and then a non-aqueous electrolyte solution (a viscosity of 5.23 cP at 25° C.) obtained by dissolving 1.5M of $LiBF_4$ into a mixed solvent in which ethylene carbonate and γ-butyrolactone were mixed at a ratio of 2:3 (v/v, with a viscosity of 2.0 cP at 25° C.) was injected therein. After that, a cylindrical lithium secondary battery was made in a general manner.

Comparative Example 1

A coin cell was made in the same way as the example 1, except that a polyethylene/polypropylene lamination film on which a porous coating layer is not formed during the separator preparing process of the example 1 was used as the separator.

Comparative Example 2

A coin cell was made in the same way as the example 3, except that a polyethylene/polypropylene lamination film on which a porous coating layer is not formed during the separator preparing process of the example 3 was used as the separator.

Comparative Example 3

A coin cell was made in the same way as the example 5, except that a porous coating layer is not formed was not formed on a polyethylene/polypropylene lamination film during the separator preparing process of the example 5 was used as the separator.

Comparative Example 4

A coin cell was made in the same way as the example 7, except that a porous coating layer is not formed on a polyethylene/polypropylene lamination film during the separator preparing process of the example 7 was used as the separator.

Comparative Example 5

A coin cell was made in the same way as the example 10, except that a porous coating layer is not formed on a polyethylene/polypropylene lamination film during the separator preparing process of the example 10 was used as the separator.

Comparative Example 6

A cylindrical lithium secondary battery was made in the same way as the example 11, except that a non-aqueous electrolyte solution (with a viscosity of 3.15 cP at 25° C.) obtained by dissolving 1.5M of $LiBF_4$ into a mixed solvent in which ethylene carbonate, γ-butyrolactone and dimethyl carbonate were mixed at a ratio of 2:3:3 (v/v, a viscosity of 1.28 cP at 25° C.) was used instead of the non-aqueous electrolyte solution of the example 11.

Comparative Example 7

A cylindrical lithium secondary battery was made in the same way as the Comparative Example 6, except that a non-aqueous electrolyte solution (a viscosity of 2.07 cP at 25° C.) obtained by dissolving 0.5M of $LiBF_4$ into a mixed solvent in which ethylene carbonate, γ-butyrolactone and dimethyl carbonate were mixed at a ratio of 2:3:2 (v/v, a viscosity of 1.44 cP at 25° C.) was used instead of the non-aqueous electrolyte solution of the Comparative Example 6.

Comparative Example 8

A cylindrical lithium secondary battery was made in the same way as the Comparative Example 6, except that a non-aqueous electrolyte solution (a viscosity of 4.81 cP at 25° C.) obtained by dissolving 2.5M of $LiBF_4$ into a mixed solvent in which ethylene carbonate, γ-butyrolactone and dimethyl carbonate were mixed at a ratio of 2:3:3 (v/v, a viscosity of 1.28 cP at 25° C.) was used instead of the non-aqueous electrolyte solution of the Comparative Example 6.

Evaluation of Charging/Discharging Characteristics

Figure 2:
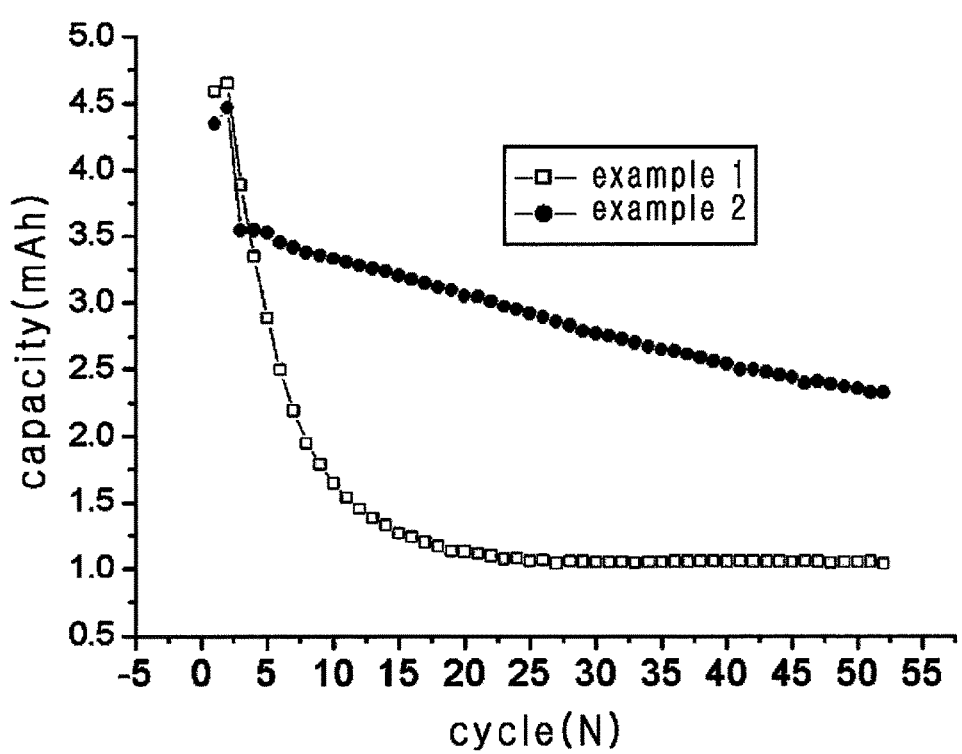
FIG. 2 is a graph showing charging/discharging results for coin cells according to examples 1 and 2, executed under the condition of 0.5 C cycle.

FIG. 1 is a graph showing charging/discharging results for the coin cell prepared according to the comparative example 1, and FIG. 2 is a graph showing charging/discharging results for the coin cells prepared according to the examples 1 and 2 under the condition of 0.5 C cycle.

Referring to the figures, it is impossible to charge/discharge the coin cell of the comparative example 1 using a non-aqueous electrolyte solution comprising a high-viscous non-aqueous solvent and a separator without a porous coating layer. However, the coin cells of the examples 1 and using a non-aqueous electrolyte solution comprising a high-viscous non-aqueous solvent and a separator with a porous coating layer exhibit an excellent charging/discharging performance. In particular, the coin cell of the example 2 using a polyethyleneterephthalate non-woven fabric as the porous substrate exhibits more excellent charging/discharging performance than the coin cell of the example 1 using a polyolefin-based porous film as the porous substrate. This result is judged as being caused by the kind of polymer of the non-woven fabric and the porosity of the non-woven fabric.

Figure 3:
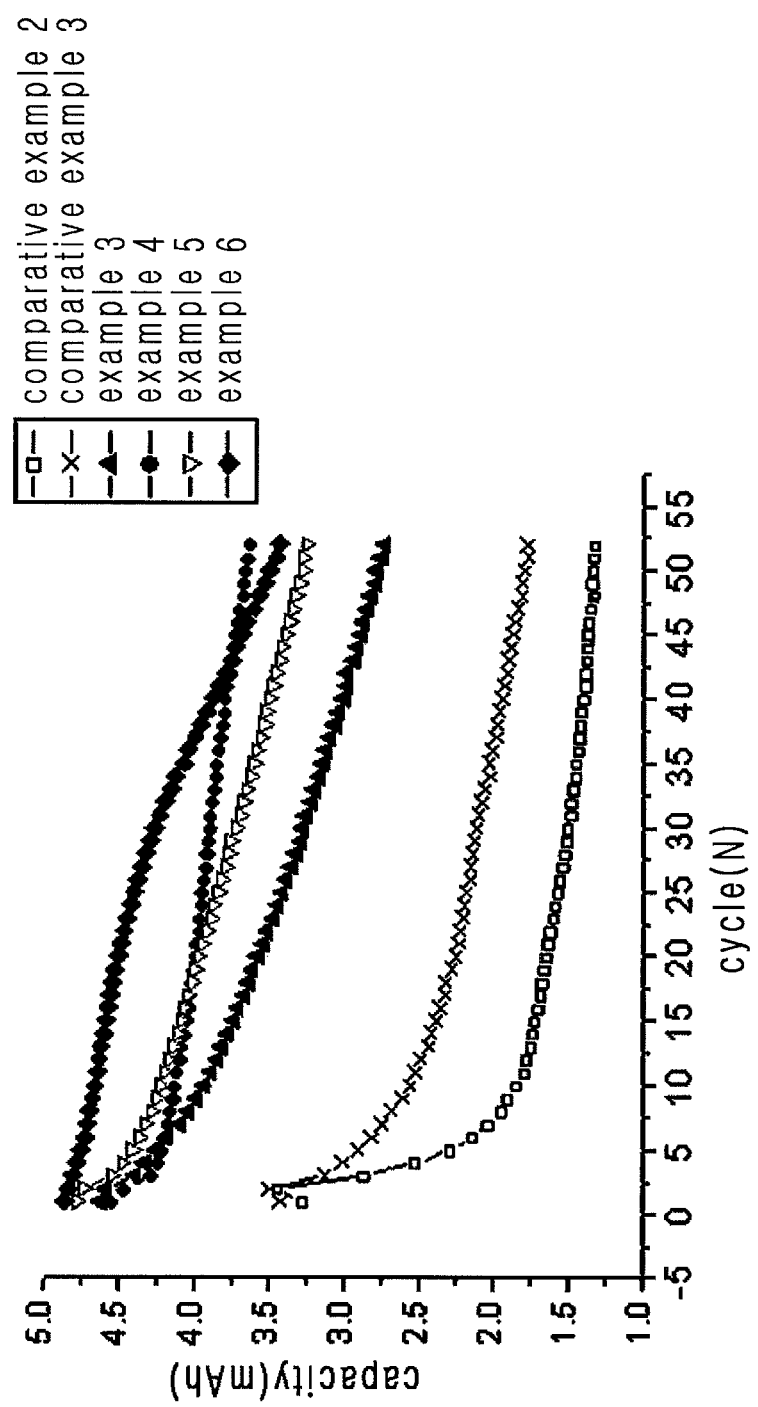
FIG. 3 is a graph showing charging/discharging results for coin cells according to examples 3 to 6 and comparative examples 2 to 3.

FIG. 3 is a graph showing charging/discharging results for the coin cells prepared according to the examples 3 to 6 and the comparative examples 2 to 3. Referring to the figures, it would be understood that the coin cells of the comparative examples 2 and 3 using a separator without a porous coating layer together with a high-viscous non-aqueous solvent exhibit very poor charging/discharging performance, but the coin cells of the examples 3 to 6 using a separator having a porous coating layer together with a non-aqueous electrolyte solution comprising a high-viscous non-aqueous solvent exhibit excellent charging/discharging performance. Here, the coin cells of the examples 4 and 6 using a polyethyleneterephthalate non-woven fabric as the porous substrate exhibit more excellent charging/discharging performance than the coin cells of the examples 3 and 5 using a polyolefin-based porous film as the porous substrate.

Figure 4:
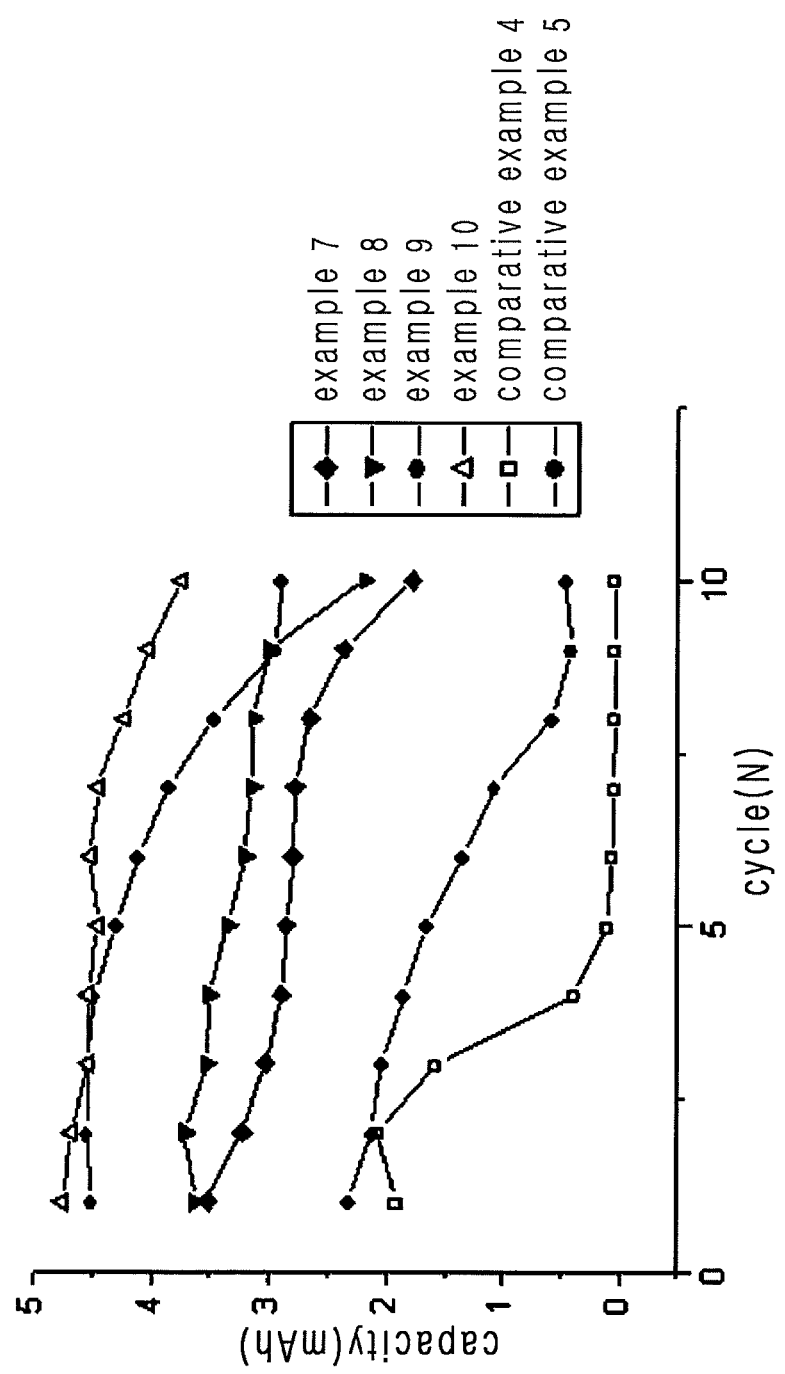
FIG. 4 is a graph showing charging/discharging results for coin cells according to comparative examples 4 to 5 and examples 7 to 10.

Meanwhile, FIG. 4 is a graph showing charging/discharging results under the cycle of 0.2 C for the coin cells according to the examples 7 to 10 and the Comparative Examples 4 to 5. Referring to the figure, it would be understood that the coin cell of the Comparative Example 4 using a separator without a porous coating layer and using an ionic liquid as a non-aqueous solvent exhibits very bad charging/discharging performance, but the coin cell of the example 7 using an ionic liquid together with a separator having the porous coating layer of the present invention exhibits excellent charging/discharging performance.

Also, it could be found that the coin cells of the examples 9 to 10 using a mixed solvent of ionic liquid and carbonate exhibit more excellent performance than the coin cells of the comparative examples 4 to 5 using an ionic liquid solely or an ionic liquid and a carbonate solvent in mixture together with a separator having no porous coating layer.

Evaluation of Overcharging Characteristics 10 cylindrical lithium secondary batteries were prepared in accordance with the example 11 and the comparative examples 6 to 8, respectively, and each battery was charged to 4.2V. The charged batteries were overcharged up to 10V with a constant current of 2 A. Subsequently, as a constant voltage of 18.5V was maintained for 6 hours, the batteries were observed whether firing or explosion occurs. The observation results are in the following table 2.

Further, overcharged cylindrical lithium secondary batteries were put into an oven at a temperature of 60° C. After that, the time when the batteries were internal shorted due to malfunction of CID which is a device for preventing overcharge was observed and its results are disclosed in the following table 2.

TABLE 2

| | Example 7 | Comparative example 6 | Comparative example 7 | Comparative example 8 |
|---|---|---|---|---|
| Number of Fired or exploded batteries | 0 | 3 | 5 | 3 |
| Number of not-fired or not-exploded batteries | 10 | 7 | 5 | 7 |
| Point of CID malfunction | >100 days | <15 days | <13 days | <18 days |

Referring to the table 2, it would be understood that the lithium secondary battery of the comparative examples 6 to 8 wherein the lithium salt is included in a low concentration or the high-viscous non-aqueous solvent capable of preventing overcharge is insufficient couldn't inhibit explosion at overcharge. On the other hand, the lithium secondary battery of the example 7 using the high-viscous non-aqueous solvent according to the present invention exhibits excellent stability against overcharge and generates less gas under a high-temperature environment, which prevents CID malfunction.

What is claimed is:

1. A lithium secondary battery, which includes a cathode, an anode, a separator interposed between the cathode and the anode, and a non-aqueous electrolyte solution comprising a lithium salt and a non-aqueous solvent,
   wherein the separator includes:
   a porous substrate having pores; and
   a porous coating layer located on at least one surface of the porous substrate and having inorganic particles and a binder polymer, the inorganic particles being connected and fixed to each other by means of the binder polymer, and the porous coating layer having pores therein formed by interstitial volumes among the inorganic particles,
   wherein the non-aqueous electrolyte solution has a viscosity of 3.5 cP or above and 60 cP or less at 25° C., and
   wherein the non-aqueous solvent is a high-viscous non-aqueous solvent having a viscosity of 4.1 cP or above and 50 cP or less at 25° C.

2. The lithium secondary battery according to claim 1, wherein the non-aqueous solvent is selected from group consisting of γ-butyrolactone, fluoroethylene carbonate, ethylene carbonate, propylene carbonate, butylene carbonate, 2,3-butylene carbonate, iso-butylene carbonate, difluoroethylene carbonate, sulfolane, succinonitrile, glutaronitrile, adiponitrile, suberonitrile, sebaconitrile, and their mixtures.

3. The lithium secondary battery according to claim 1, wherein the lithium salt is included in a concentration of 0.8 M or above and 2.0 M or less in the non-aqueous electrolyte solution.

4. The lithium secondary battery according to claim 1, wherein the lithium salts are at least one selected from the group consisting of $LiPF_6$, $LiBF_4$, LiFSI (Lithium bis(fluorosulfonyl)imide, $F_2NO_4S_2Li$), LiBETI (lithium bisperfluoroethanesulfonimide, $LiN(C_2F_5SO_2)_2$), LiTFSI (lithium (bis)trifluoromethanesulfonimide, $LiN(CF_3SO_2)_2$), $CF_3SO_3Li$, $LiC(CF_3SO_2)_3$, $LiSbF_6$, $LiAsF_6$, $LiClO_4$, LiDFOB ($LiC_2BO_4F_2$), LiTFOP ($LiC_2PO_4F_4$), LiDFOP ($LiC_4PO_4F_2$), LiDFP ($LiPO_2F_2$), $LiN(C_2F_5SO_2)_2$ and LiBOB($LiC_4BO_8$) and mixtures thereof.

5. The lithium secondary battery according to claim 1, wherein the non-aqueous electrolyte solution has a viscosity of 3.5 cP or above and 50 cP or less at 25° C.

6. The lithium secondary battery according to claim 1, wherein the porous substrate is a polyolefin-based porous film.

7. The lithium secondary battery according to claim 5, wherein the polyolefin-based porous film is any one polymer selected from the group consisting of polyethylene, polypropylene, polybutylene and polypentene, or their mixtures.

8. The lithium secondary battery according to claim 1, wherein the porous substrate is a non-woven fabric made of any one polymer selected from the group consisting of polyester, polyacetal, polyamide, polycarbonate, polyimide, polyetheretherketone, polyethersulfone, polyphenylene oxide, polyphenylene sulfide and polyethylene naphthalene, or their mixtures.

9. The lithium secondary battery according to claim 1, wherein the inorganic particles have an average diameter of 0.001 to 10 μm.

10. The lithium secondary battery according to claim 1, wherein the inorganic particles are selected from the group consisting of inorganic particles having a dielectric constant of 5 or above and inorganic particles having lithium ion transferring capability, or their mixtures.

11. The lithium secondary battery according to claim 10, wherein the inorganic particles having a dielectric constant of 5 or above are any one kind of inorganic particles selected from the group consisting of $BaTiO_3$, $Pb(Zr,Ti)O_3$ (PZT), $Pb_{1-x}La_xZr_{1-y}Ti_yO_3$ (PLZT, here $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or their mixtures.

12. The lithium secondary battery according to claim 10, wherein the inorganic particles having lithium ion transferring capability are any one kind of inorganic particles selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or their mixtures.

13. The lithium secondary battery according to claim 1, wherein the binder polymer has a solubility parameter of 15 to 45 $Mpa^{1/2}$.

14. The lithium secondary battery according to claim 1, wherein the binder polymer is any one binder polymer selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or their mixtures.

15. The lithium secondary battery according to claim 1, wherein a weight ratio of the inorganic particles and the binder polymer in the porous coating layer is 50:50 to 99:1.

16. The lithium secondary battery according to claim 1, wherein the porous substrate has a thickness of 1 to 100 μm, and the porous coating layer has a thickness of 0.01 to 20 μm.

17. The lithium secondary battery according to claim 1, wherein the anode is composed of at least one selected from the group consisting of lithium metal, lithium alloy, carbon, petroleum coke, activated carbon, graphite and lithium adsorption material.

18. The lithium secondary battery according to claim 1, wherein the non-aqueous solvent is at least one selected from the group consisting of γ-butyrolactone, fluoroethylene carbonate, ethylene carbonate, dimethyl carbonate, 1-ethyl-3-methylimidazolium (EMI)-trifluoromethanesulfonylamide ($(CF_3SO_2)_2N$), and their mixtures.

* * * * *